INVENTOR
GERALD A. KLUGE
BY Thomas E. Schatzel
ATTORNEY

INVENTOR.
GERALD A. KLUGE
BY Thomas E. Schatzel
ATTORNEY

March 20, 1973 G. A. KLUGE 3,721,773

MAGNETIC HEAD TRANSDUCER ASSEMBLY FOR REDUNDANTLY RECORDING DATA ON AND REPRODUCING DATA FROM DUAL-TRACKS OF A MAGNETIC RECORDING MEDIUM

Original Filed Dec. 7, 1967 3 Sheets-Sheet 3

INVENTOR.
GERALD A. KLUGE

BY Thomas C. Schatzel

ATTORNEY

United States Patent Office 3,721,773
Patented Mar. 20, 1973

3,721,773

MAGNETIC HEAD TRANSDUCER ASSEMBLY FOR REDUNDANTLY RECORDING DATA ON AND REPRODUCING DATA FROM DUAL-TRACKS OF A MAGNETIC RECORDING MEDIUM

Gerald A. Kluge, Redwood City, Calif., assignor to Ampex Corporation, Redwood City, Calif.

Continuation of abandoned application Ser. No. 695,542, Dec. 7, 1967. This application Oct. 9, 1970, Ser. No. 79,647
Int. Cl. G11b *5/28, 5/44, 5/52*
U.S. Cl. 179—100.2 T 9 Claims

ABSTRACT OF THE DISCLOSURE

A data processing method and system for redundant recording and reproducing of digital or other forms of data on a magnetic medium utilizing a single channel of processing electronics. In record, the data is fed through a single channel of processing electronics to a pair of transducers of a head assembly whereat the signal is divided to create two redundant tracks on the tape. In playback, the redundant data is simultaneously reproduced from dual tape tracks and summed together directly at the head assembly and processed as a single playback signal by a standard single channel of processing electronics to reconstitute the original data with negligible error due to tape dropouts.

This application is a continuation of the prior application Ser. No. 695,542, filed Dec. 7, 1967, which prior application is now abandoned.

BACKGROUND OF THE INVENTION

The erroneous information reproduced in rotary head magnetic tape recorder/reproducer systems, such as the system disclosed in U.S. Pat. 3,304,377 granted to Erhard K. Kietz et al. and assigned to the assignee of the present invention, is due primarily to tape dropouts. The Kietz et al. system employs a timing pilot signal for electromechanical and electronic time base correction and slow switching to combine the time base corrected reproduce signals coming sequentially from the transducers of the rotating head assembly to provide a continuous signal that is virtually free of time base errors and switching transients. Any remaining significant errors are due to tape dropouts, i.e., magnetic and/or mechanical imperfections in the tape. Most dropouts can be attributed to oxide voids incurred in the tape at the time of manufacture, loose oxide, scratches, crinkling or other mishandling of the tape or oxide build-up on the head. Dropout errors can thus be minimized to a low order by preselecting the tape for a minimum of oxide voids and exercising precautions in the handling and use of the tape. However, in certain applications it is desirable that the dropout errors be reduced to the extent that they are virutally non-existent. For example, in processing digital data on magnetic tape with an extremely low error rate such as one bit in $10^9$, the dropout errors must be held to a considerably lower order than is obtainable by preselection and careful handling of present comercially available tape.

United States patent application Ser. No. 623,864, now U.S. Pat. 3,497,634, of Sidney S. Damron and Burnet M. Poole discloses a wideband instrumentation rotary head recording and reproduce system with minimized errors due to tape dropouts. The system incorporates redundant recording of signals on the magnetic tape. In both the reproduce and record modes, redundant signals are separately processed through separate channels of electronics. Thus, though errors due to dropout are greatly minimized, to realize redundant recording the number of transducers and channels of processing electronics are doubled.

SUMMARY OF THE INVENTION

The present invention is directed at a system and method for realizing an extremely low rate of error due to tape dropouts in the magnetic recording and reproducing of signals. The method and system require only a single channel of electronics and is particularly adapted for incorporation with wideband rotary head magnetic tape recorders/reproducers.

The invention utilizes the redundant recording principle that the probability of dropouts occurring simultaneously at two random points on a magnetic tape is very low provided that the distance between the points is large in comparison to the size of the dropouts. In general, the invention provides for the redundant recording of information on dual channels of a magnetic tape. In the record mode, the electrical signal to be recorded is applied to a single channel of processing electronics which provide a record signal responsive to the input signal and recordable on a magnetic medium. The processing electronics extends to a pair of transducers wherein the signal is transformed to a pair of redundant, in phase magnetic signals each of which forms a separate track on the magnetic medium. For example, video, radar, digital or other wideband information is recorded simultaneously and redundantly as an FM carrier by a pair of transducers mounted on the drum of a wideband rotary head recorder and reproducer system. The transducers are spaced apart on the drum so that in the record mode each transducer forms a separate spaced track on the tape as the drum rotates transversely across the tape. The spacing between the associated transducers and tracks is selected such that the spacing between redundant information is larger than the expected maximum diametrical size of potential dropouts. Thus, while the reliability resulting from redundant recording is maintained, the use of only a single channel of record electronics provides cost and weight savings. Furthermore, system reliability is increased because fewer components are required.

In the reproduce mode, the redundant signals are simultaneously sensed and summed together directly at the head assembly prior to processing in the reproduce electronics. Though it is assumed in this discussion that the signals are FM carriers, it must be understood that the method of summation directly at the heads has equal application to other forms of recording and modulation, e.g., phase modulation, carrier shift modulation, and bias recording. The carriers of the respective signals being substantially in phase at the time of adding at the head assembly are such that if a dropout occurs in one channel the level of the summation signals is merely halved (dropped six db) and not lost. The only time the carrier is lost is when dropouts occur simultaneously in both channels. But as previously noted, the probability of this is extremely low since diverse spaced-apart sections of the tape are involved. The summed signal from the transducers is then received by a single channel of reproduce processing electronics. With an FM modulated signal, if a dropout occurs the decrease in amplitude has no effect on the reproduce signal. The modulated signal is demodulated independent of the amplitude decrease in accordance with FM principles and the original information is reconstituted.

DESCRIPTION OF THE PREFERRED EMBODIMENT

Figure 1:
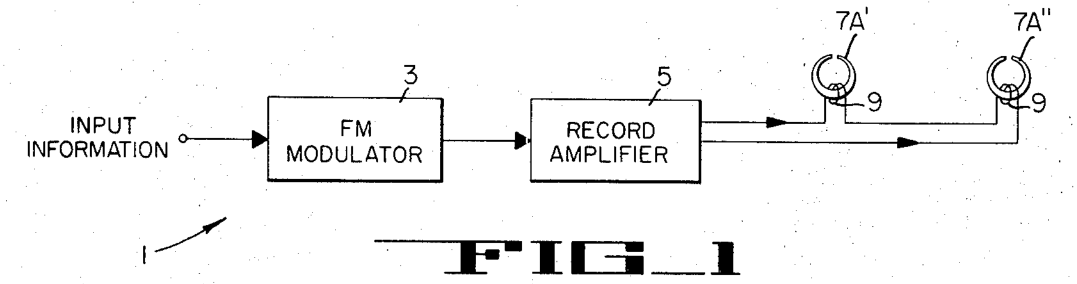
FIG. 1 is a generalized block diagram of processing electronics and associated transducers for redundant recording of data according to the present invention.

Referring to FIGS. 1–4, there is illustrated representative circuitry, a head assembly and resulting recorded tape format of a method and system for redundantly recording data on a magnetic tape medium utilizing only a single channel of electronics and incorporating the principles of the present invention. In FIG. 1, an input information signal such as a wideband analog or digital signal comprising the data to be recorded is received by a single channel of record electronics referred to by the general reference character 1. The input signal can have any form compatible with the bandwidth and dynamic range of the electronics. For example, it can comprise radar signals or telemetry signals (in detected or in predetection form, in the latter case, if a suitable frequency translation precedes the recording process), or a television signal of a scanning format compatible with the recorder bandwidth, or pulse trains representing digital data. The circuitry provides means for receiving the input information signal and provides an FM signal, modulated responsive to the input signal. The circuitry includes an FM modulator 3 and record amplifier means 5. The modulator generates an RF carrier, the frequency of which varies responsive to the information signal. The modulated signal is received by the record amplifier means 5 and amplified prior to being received simultaneously by a set of appropriate record transducers which may be part of a rotary head assembly.

The record transducers in FIG. 1 are symbolically represented as a pair of individual transducers 7A′ and 7A″ with energizing coils 9 connected in series and extending to the record amplifier means 5. Thus, each record transducer 7A′ and 7A″ forms a separate magnetic circuit with a non-magnetic gap for forming a fringing flux. Each transducer is subjected to the same signal thereby generating magnetic redundant, in phase signals at the record gaps of the respective transducers. As will hereinafter be described in more detail, the two transducers 7A′ and 7A″ are subjected to separate spaced apart segments of a magnetic medium, e.g., magnetic tape, on which the input information signal is to be recorded.

Figure 2:
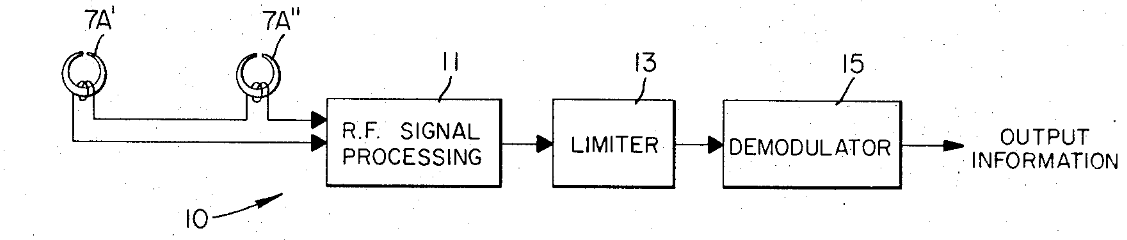
FIG. 2 is a generalized block diagram of processing electronics and associated transducers for reproducing redundant recorded data according to the present invention.

In the reproduce mode a single channel of appropriate reproduce processing electronics, represented by the general reference character 10, is adapted to receive a reproduce signal from appropriate reproduce transducers. The reproduce transducers may be separate or part of the transducers 7A′ and 7A″ which may be designed for both record and reproduce operation. Assuming the latter, the reproduce electronics 10 is switched into association with the transducers 7A′ and 7A″ as illustrated in FIG. 2. The record/reproduce transducers 7A′ and 7A″ with the energizing coils joined together in the reproduce mode, sum the redundant information sensed from the separate previously recorded tracks on the tape medium and provide an electrical signal representative of the sensed signal. By properly placing the transducers in relationship to the tape, the redundant tracks are simultaneously sensed with the sensed signals in phase such that summing occurs at the associated transducers 7A′ and 7A″. The summed signal provided at the terminals of the associated energizing coils is received by appropriate RF signal processing circuitry 11, limited by limiter electronics 13 and in turn applied to a demodulator 15. The demodulator 15 produces an output information signal which is a reconstitution of the original input information signal and which has an extremely low number, if any, tape dropout errors.

Figure 3A:
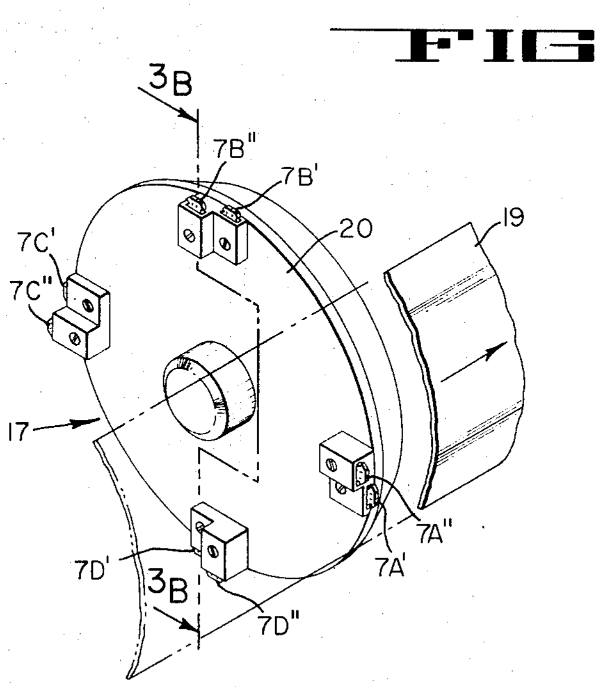
FIGS. 3A and 3B are front and side views, respectively, of a transverse-scan rotary-head assembly suitable for redundant recording according to the present invention.
Figure 3B:
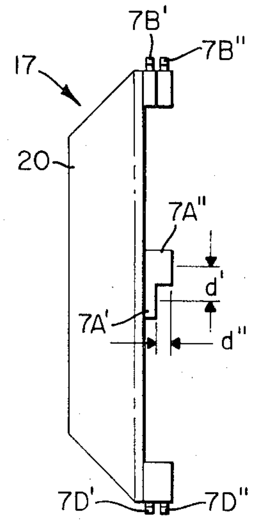

Up to this point only a single channel of redundant recorded information has been discussed. Obviously, to realize more efficient recording with a transverse-scan rotary-head assembly a plurality of recording channels should preferably be accommodated. FIGS. 3A and 3B symbolically illustrate a rotary head assembly, referred to by the general reference character 17, which may accommodate four separate pairs of transducers for redundant recording on a longitudinal moving tape medium 19. The various transducers are mounted on a drum 20 of the rotary head assembly such that the tape medium 19 is continuously exposed to at least one of the transducers. The rotary head assembly 17 may be of the general nature which sweeps the transducers in sequence transversely across the longitudinally moving tape. Such head assemblies are commonly found on rotary head transverse recording video tape recording and reproducing systems. The individual pairs of transducers, indicated 7A′ and 7A″; 7B′ and 7B″; 7C′ and 7C″; and 7D′ and 7D″ are circumferentially spaced apart on the drum 20 approximately ninety (90) degrees. As illustrated the transducer 7A′ is circumferentially offset with respect to 7A″ along the outer periphery of the drum 20. In FIG. 3B the circumferential offset distance is designated *d′*. Likewise, the other designated single prime transducers (7B′, 7C′ and 7D′) are circumferentially offset a distance *d′* about the drum 20 with respect to the associated double prime transducer (7B″, 7C″ and 7D″). As shall hereinafter become more evident, the circumferential offset *d′* allows for transverse spacing on the tape medium 19 between redundant recorded points as the medium is transversely scanned by the transducers mounted on the rotary head assembly 17. It may be further noted as illustrated by FIG. 3B that the associated transducers of each pair of transducers are transversely offset with respect to one another on the drum of head assembly 17. The transverse offset, designated *d″* in FIG. 3B, allows for longitudinal spacing between redundant tracks on the tape medium 19. The circumferential and transverse offset distances may be selected so that the net offset exceeds the expected maximum diametrical size of a potential dropout. It should be appreciated that the disclosed transducer arrangement is merely illustrative and that there are other head assembly and transducer arrangements for redundant recording compatible with the present invention. Co-pending patent application Ser. No. 688,744 of Joseph Chupity and filed concurrently herewith, now United States Pat. No. 3,549,822, illustrates a single transducer having a pair of recording gaps and highly suitable for redundant recording and reproducing according to the teachings of the present invention.

Figure 4:
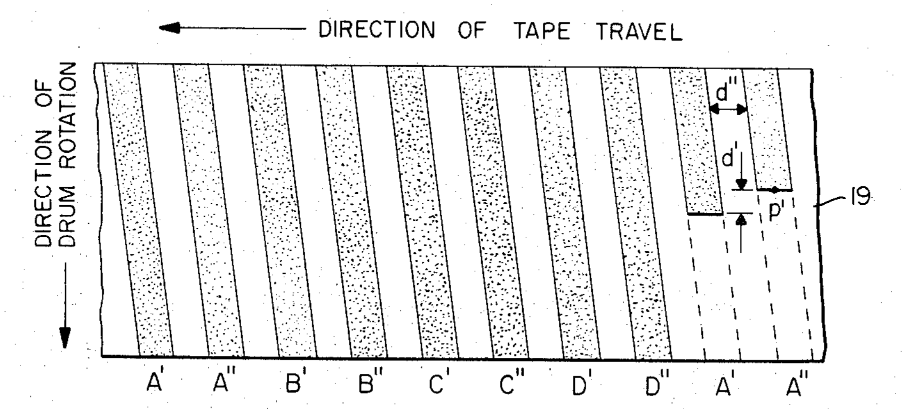
FIG. 4 is a representation of a strip of tape having dual channels of information redundantly recorded thereon by the head assembly of FIGS. 3A and 3B.

FIG. 4 graphically represents the record pattern of a segment of the tape 19. The tracks recorded by each transducer 7A′, 7A″, 7B′, 7B″, 7C′, 7C″, 7D′ and 7D″ are designated. The illustrated pattern assumes the rotational direction of the head 17 and longitudinal movement of the tape 19 indicated in FIGS. 3A and 3B. As illustrated by the stop of the tracks A′ and A″ in FIG. 4, the circumferential offset *d′* of the transducers of each pair results in transverse displacement between redundant points of recorded information. Thus, even a longitudinal scratch on the tape does not cause a complete dropout. Likewise, the transverse offset $d''$ of the transducers of each pair allows for longitudinal displacement of the redundant tracks with respect to one another. The longitudinal displacement my be viewed as the guard band. Assuming a dropout occurs at one point on the tape, e.g., P', by selecting the offset distance $d'$ to exceed the expected maximum diametrical size of the dropouts, there will not be a complete loss of signal. To the contrary, there will be only loss of one-half the composite redundantly recorded signal when the signals are summed at the associated transducers in the reproduce mode.

Figure 5:
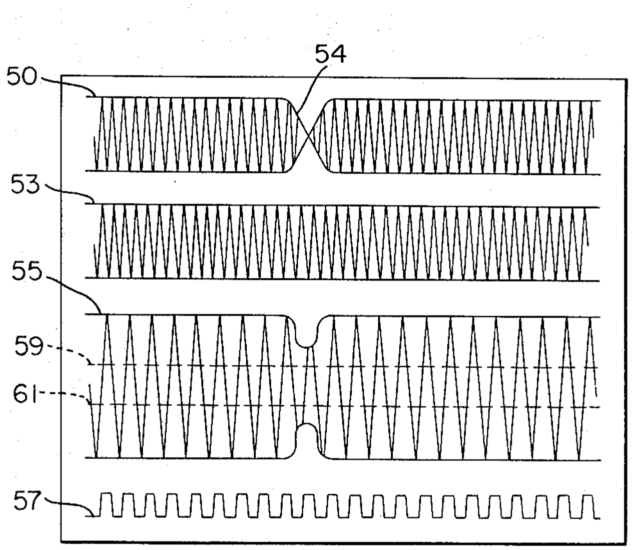
FIG. 5 is an illustration of signal waveforms at various points in the reproduce electronic portion of the system of FIG. 2.

The operation of the redundant recording in materially reducing tape dropout errors is further illustrated by the pertinent signal waveforms of FIG. 5, which coincide with the reproduce signal at designated points in the reproduce electronics 10 of FIG. 2. The signal waveforms 50 and 53 represent the continuous redundant FM information signal sensed by the associated transducers of each pair. The signal 50 may be viewed as appearing across the energizing coils of one transducer, e.g., 7A', and the signal 53 across the other coil of the other associated transducer, e.g., 7A''. The signals are in phase and contain redundant information. Waveform 50 includes an illustrated complete dropout such that the FM carrier drops to zero at point 54. The waveform 53 is free of dropouts. With the energizing coils of the associated pair of transducers commonly joined, the waveforms 50 and 53 are summed at the associated transducers with the resulting summation signal represented by the waveform 55. It is to be noted that the carrier of the summation signal 55 has a normal peak-to-peak amplitude twice that of the individual signals 50 and 53. In the region of the dropout, the peak-to-peak amplitude of the summation signal 55 drops to half the normal value, i.e., the level of the RF envelope drops six decibels. However, the reproduce electronics 10 is still responsive to the composite signal and provides an output which is not sensitive to the six decibel decrease. The limiter 13 in the processing electronics which receives the signal 55 may have limiting values as indicated by the values 59 and 61 which are less than the peak-to-peak values of either individual signals 50 or 53. Thus, the output of the limiter is as represented by waveform 57. There is no loss of the FM carrier despite the dropout and the limiter output appears as it would in the absence of the dropout.

It is important to note the point in the reproduce circuit in which summation of the redundant signals is accomplished. More specifically, the signals are summed at the transducers themselves. Since the signals are recorded in phase, there are not phase errors in the reproduced signals provided that the recorder is properly synchronized in relationship to the originally recorded signal. It will be appreciated that the single channel redundant recording of the present invention is well suited for processing digital data by virtue of the extremely low tape dropout error rate. By adopting an appropriate standard for the distances $d'$ and $d''$, tape speed and drum speed, recorded tapes are compatible for interchangeability between recorder/reproducer systems.

Figure 6:
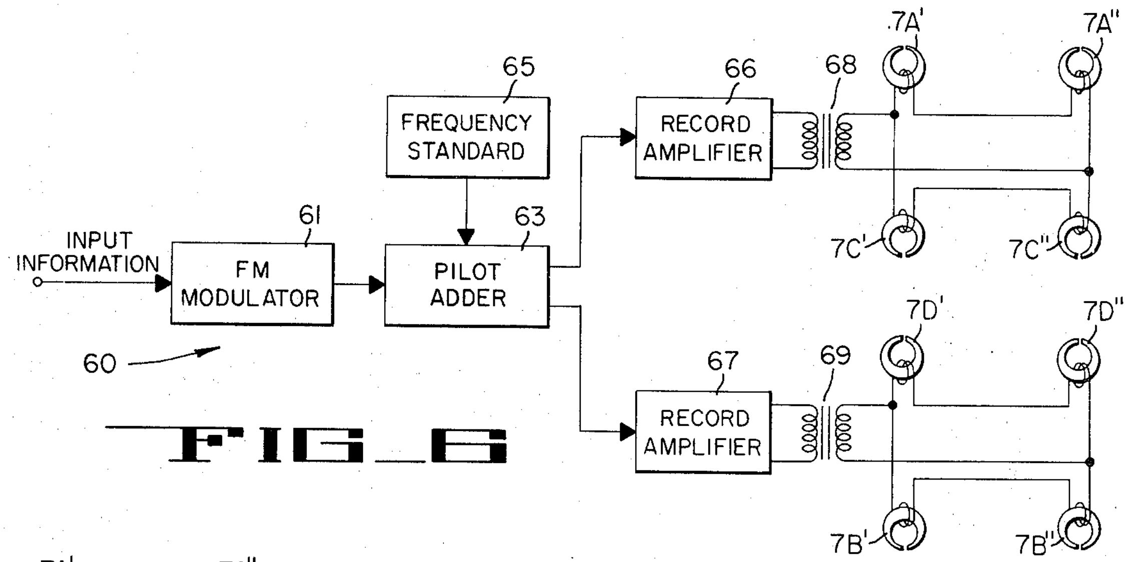
FIG. 6 illustrates in further detail a block circuit diagram of the record electronics of a system incorporating the teachings of the present invention.

FIG. 6 illustrates a more detailed circuit diagram of record electronics for redundant recording of data according to the teachings of the present invention. The circuitry, referred to by the general reference character 60, is designed to accommodate four pairs of transducers mounted on a rotary drum similar to that illustrated by FIG. 3A. The circuitry includes an FM modulator 61 receiving the input information signals. The modulated signal is rereceived by a pilot adder 63 where a pilot signal from a frequency standard 65 is added to it. The output of the pilot adder 63 is fed through two parallel record amplifiers 66 and 67 where said signals to be recorded are amplified. The output of the record amplifiers 66 and 67 are respectively received by a pair of rotary transformers 68 and 69 which are incorporated as a means for coupling the signal to and from the transducers on the rotary head. Though separate record amplifiers 66 and 67 are illustrated, a single amplifier having adequate rating could be utilized to drive both transformers 68 and 69. The secondary output of the rotary transformer 68 is received by the transducers 7A' and 7A'' of which the energizing coils are connected in series such that the associated transducers receive similar signals. In parallel with the series connected energizing coils of the transducers 7A' and 7A'' are the series connected energizing coils of the transducers 7C' and 7C''. Referring again to FIG. 3A, it may be noted that the pairs of transducers 7A', 7A'' and 7C', 7C'' are positioned on the drum 20 approximately directly opposite each other such that when one pair of transducers scans the tape medium 17, the other pair is off the tape. Thus, though all transducers are driven simultaneously with the same input information signal, only the pair in contact with the tape will be recording tracks. Similarly, the secondary of the rotary transformer 69 extends to the series connected energizing coils of the transducers 7D' and 7D''. The pairs of transducers 7B', 7B'' and 7D', 7D'' are positioned approximately directly opposite each other such that there is no interference. It may be noted in FIG. 6 that though each transducer of each pair records a separate transverse track and the information is redundantly recorded, only a single channel of record electronics is used.

Figure 7:
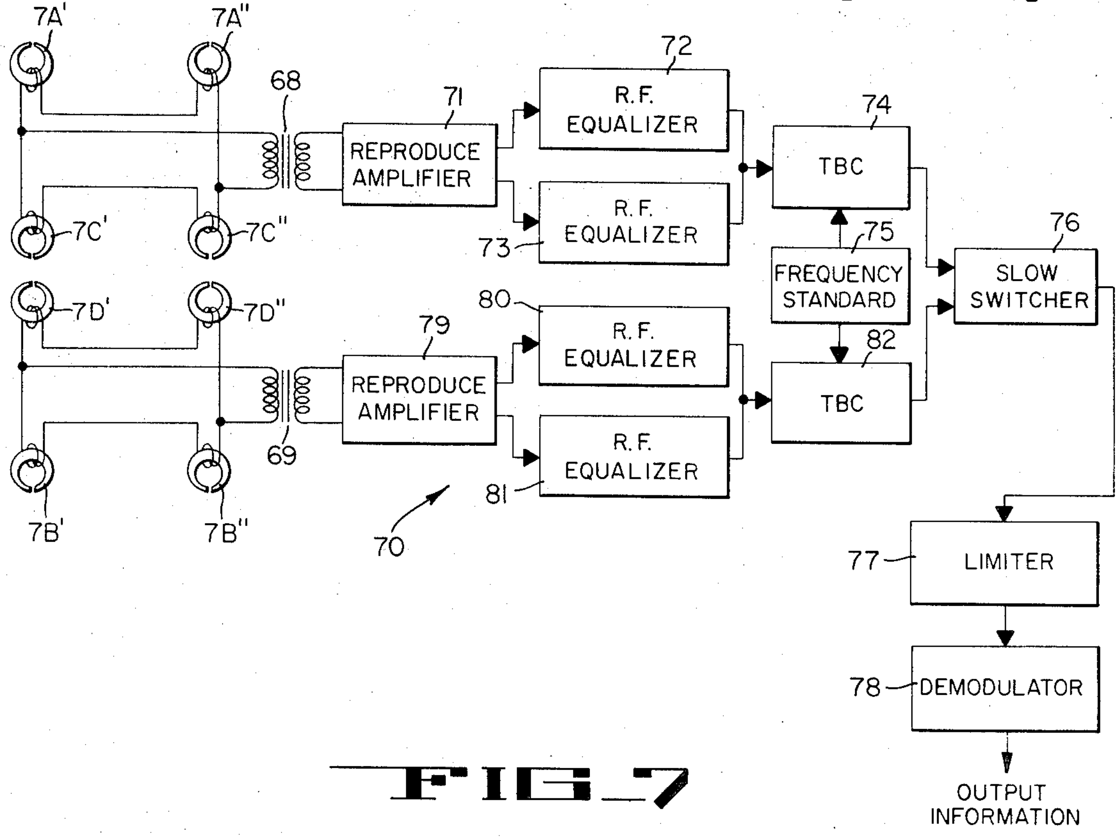
FIG. 7 illustrates in further detail a block circuit diagram of the reproduce electronics of a system incorporating the teachings of the present invention.

Referring to FIG. 7, there is illustrated a more detailed circuit diagram of reproduce electronics for reconstituting the redundantly recorded data. The reproduce electronics, referred to by the general reference character 70, may be switched across the primary windings of the rotary transformers 68 and 69. Similar to the recording process associated pairs of transducers may sense associated tracks. More specifically, referring to FIG. 4, the transducers 7A' and 7A'' sense the redundant channels A' and A'', the transducers 7B' and 7B'' sense the redundant channels B' and B'', the transducers 7C' and 7C'' sense the redundant channels C' and C'', and the transducers 7D' and 7D'' sense the redundant channels D' and D''.

Each pair of transducers sense the signals of the associated tracks. The connection of the energizing coils of associated transducers allows for the redundant signals to be summed at the transducers and passed to the associated rotary transformer 68 or 69. The primary of the transformer 68 extends to a reproduce amplifier 71 where the FM signal is amplified. The output of the amplifier 71 is received by a pair of RF equalizers 72 and 73 for appropriate equalization. The RF equalizer 72 equalizes the redundant signals from transducers 7A' and 7A'' and the equalizer 73 equalizes the redundant signals from transducers 7C' and 7C''. The equalizers 72 and 73 are sequentially operative on a time sequence basis. The equalizer 72 is operative when the transducers 7A' and/or 7A'' are in contact with the tape. The equalizer 73 is operative when the transducers 7C and/or 7C'' are in contact with the tape. The equalizers 72 and 73 are each in turn joined to a common time base corrector 74 which also receives a reference polit signal from a frequency standard network 75. The output of the time base corrector 74 is received by a slow switcher 76, fed to a limiter 77 and then to a demodulator 78 such that the original signal recorded on tracks A', A'', C' and C'' is reconstituted.

Similarly, the primary of the transformer 69 extends to a reproduce amplifier 79, the output of which is fed to a pair of parallel connected RF equilizers 80 and 81. The equalizers 80 and 81 are similar to the equalizers 72 and 73 and equalizes the signals from the transducer pairs 7C' and 7C'' and 7D' and 7D'', respectively. The equalizers 80 and 81 are joined to a time base corrector 82 which is also connected to the frequency standard 75. The time base corrector 82 joins the slow switcher 76 such that the output of the demodulator 78 is a reconstitution of the information recorded on tracks B', B'', D' and D''. Thus, the net output of the demodulator 78 is the original signal fed to the record electronics.

What is claimed is:

1. A magnetic head transducer assembly carrying magnetic head transducers which are rotated in planes relative to a transported magnetic recording medium with each plane at an angle to the direction the medium is transported for transduction of signals simultaneously between one signal processing system and a plurality of spaced apart tracks of the magnetic recording medium comprising a rotatable body;

a set of magnetic head transducers, each transducer defining a non-magnetic recording medium, each transducer further including coil windings in magnetic circuit with its non-magnetic gap, all of the coil windings of the set of transducers connected together to couple the same signals from the processing system to the transducers of the set for redundantly recording the signals along the plurality of spaced apart tracks and to couple additively to the signal processing system the redundantly recorded signals reproduced by the transducers; and mounting means for affixing the set of magnetic head transducers to the rotatable body at a location of its periphery for transduction of signals between the magnetic recording medium and the coil windings, the transducers of the set affixed to the rotatable body with their non-magnetic gaps spaced circumferentially about the body relative to each other in separate spaced apart rotating planes to have their non-magnetic gaps simultaneously follow separate spaced apart tracks along the recording medium with the non-magnetic gap of each transducer of the set following only one track while each of the other transducers of the set follow one track during the transduction of signals between the spaced apart tracks and the coil windings of the set of transducers, the spacings of the non-magnetic gaps selected so that the gaps are spaced a distance exceeding the expected size of a potential dropout on the magnetic recording medium.

2. The magnetic head transducer assembly according to claim 1 wherein the coil windings of the set of magnetic head transducers are connected together in series in an aiding sense.

3. The magnetic head transducer assembly according to claim 1 wherein a plurality of individual sets of magnetic head transducers are similarly affixed to the rotatable body at circumferentially spaced locations about its periphery, the distance separating the circumjacent circumferentially spaced sets is greater than the circumferential separation of the transducers of each individual set.

4. The magnetic head transducer assembly according to claim 3 wherein the individual sets of magnetic head transducers are equally spaced circumferentially about the rotatable body.

5. The magnetic head transducer assembly according to claim 4 wherein the spacings of the gaps of the magnetic head transducers of each individual set are the same as those of the other sets.

6. The magnetic head transducer assembly according to claim 1 wherein the rotatable body is a drum adapted to be rotated in a direction transverse to the direction of transport of a longitudinally transported tape type magnetic recording medium, and a plurality of individual sets of magnetic head transducers are affixed to the drum at circumferentially spaced locations about its periphery, the transducers of each individual set are similarly affixed to the drum to have their non-magnetic gaps spaced relative to each other both circumferentially and in the direction of the axis of rotation of the drum.

7. The magnetic head transducer assembly according to claim 6 wherein each individual set includes two magnetic head transducers, and four individual sets of transducers are affixed about the periphery of the drum at equally spaced circumferential locations.

8. The magnetic head transducer assembly according to claim 7 wherein the coil windings of each set of magnetic head transducers are connected together in series, and the series connected coil windings of the sets of transducers affixed to the drum at opposite locations connected in parallel.

9. The magnetic head transducer assembly according to claim 8 wherein the coil windings of each set of magnetic head transducers are connected together in an aiding sense.

References Cited

UNITED STATES PATENTS

| | | | |
|---|---|---|---|
| 3,152,223 | 10/1964 | Wessels | 179—100.2 K |
| 3,497,634 | 2/1970 | Damron et al. | 179—100.2 T |
| 2,873,319 | 2/1959 | Mee | 179—100.2 C |
| 3,124,662 | 3/1964 | Ryder | 179—100.2 S |

FOREIGN PATENTS

| | | |
|---|---|---|
| 11,072 | 7/1963 | Japan. |

BERNARD KONICK, Primary Examiner

R. S. TUPPER, Assistant Examiner

U.S. Cl. X.R.

178—6.6 DC; 179—100.2 K